US 12,457,347 B2
Oct. 28, 2025

United States Patent
Hou (54) COMBINED UPSCALER AND LCEVC ENCODER

(71) Applicant: Advanced Micro Devices, Inc., Santa Clara, CA (US)

(72) Inventor: Jun Hua Hou, Shanghai (CN)

(73) Assignee: Advanced Micro Devices, Inc., Santa Clara, CA (US)

(*) Notice: Subject to any disclaimer, the term of this patent is extended or adjusted under 35 U.S.C. 154(b) by 253 days.

(21) Appl. No.: 18/171,001

(22) Filed: Feb. 17, 2023

(65) Prior Publication Data

US 2024/0283955 A1    Aug. 22, 2024

(51) Int. Cl.
*H04N 19/30* (2014.01)
*H04N 19/176* (2014.01)

(52) U.S. Cl.
CPC ........... *H04N 19/30* (2014.11); *H04N 19/176* (2014.11)

(58) Field of Classification Search
CPC .............................. H04N 19/30; H04N 19/176
See application file for complete search history.

(56) References Cited

U.S. PATENT DOCUMENTS

| | | | | |
|---|---|---|---|---|
| 2022/0201320 A1* | 6/2022 | Karunaratne | .......... | G06V 20/41 |
| 2022/0400270 A1* | 12/2022 | Meardi | ................ | H04N 19/93 |
| 2024/0259577 A1* | 8/2024 | Chai | .................... | H04N 19/59 |

OTHER PUBLICATIONS

IEEE Transactions On Circuits and Systems for Video Technology, vol. 32, No. 11, Nov. 2022 Stefano Battista, Guido Meardi, Simone Ferrara, Lorenzo Ciccarelli, Florian Maurer, Massimo Conti, Member, IEEE, and Simone Orcioni, Senior Member, IEEE.*
Battista, S., et. al.; "Overview of the Low Complexity Enhancement Video Coding (LCEVC) Standard"; IEEE Transactions on Circuits and Systems for Video Technology, vol. 32, No. 11, Nov. 2022, 13 pgs.

* cited by examiner

*Primary Examiner* — Jae N Noh
(74) *Attorney, Agent, or Firm* — Volpe Koenig (57) ABSTRACT

A disclosed technique includes obtaining input video at a first resolution; upscaling the input video to a second resolution that is higher than the first resolution, using an encoder having a low complexity enhancement video coding encoder that omits at least one component, to generate upscaled video; and encoding the upscaled video using the encoder to generate encoded output video.

20 Claims, 9 Drawing Sheets

COMBINED UPSCALER AND LCEVC ENCODER

BACKGROUND

Raw video information includes a very large amount of data. Though not completely lossless, video encoding techniques greatly compress this data while retaining much of the original information. Improvements to techniques for encoding video are constantly being made.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes obtaining input video at a first resolution; upscaling the input video to a second resolution that is higher than the first resolution, using an encoder having a low complexity enhancement video coding encoder that omits at least one component, to generate upscaled video; and encoding the upscaled video using the encoder to generate encoded output video.

Figure 1:
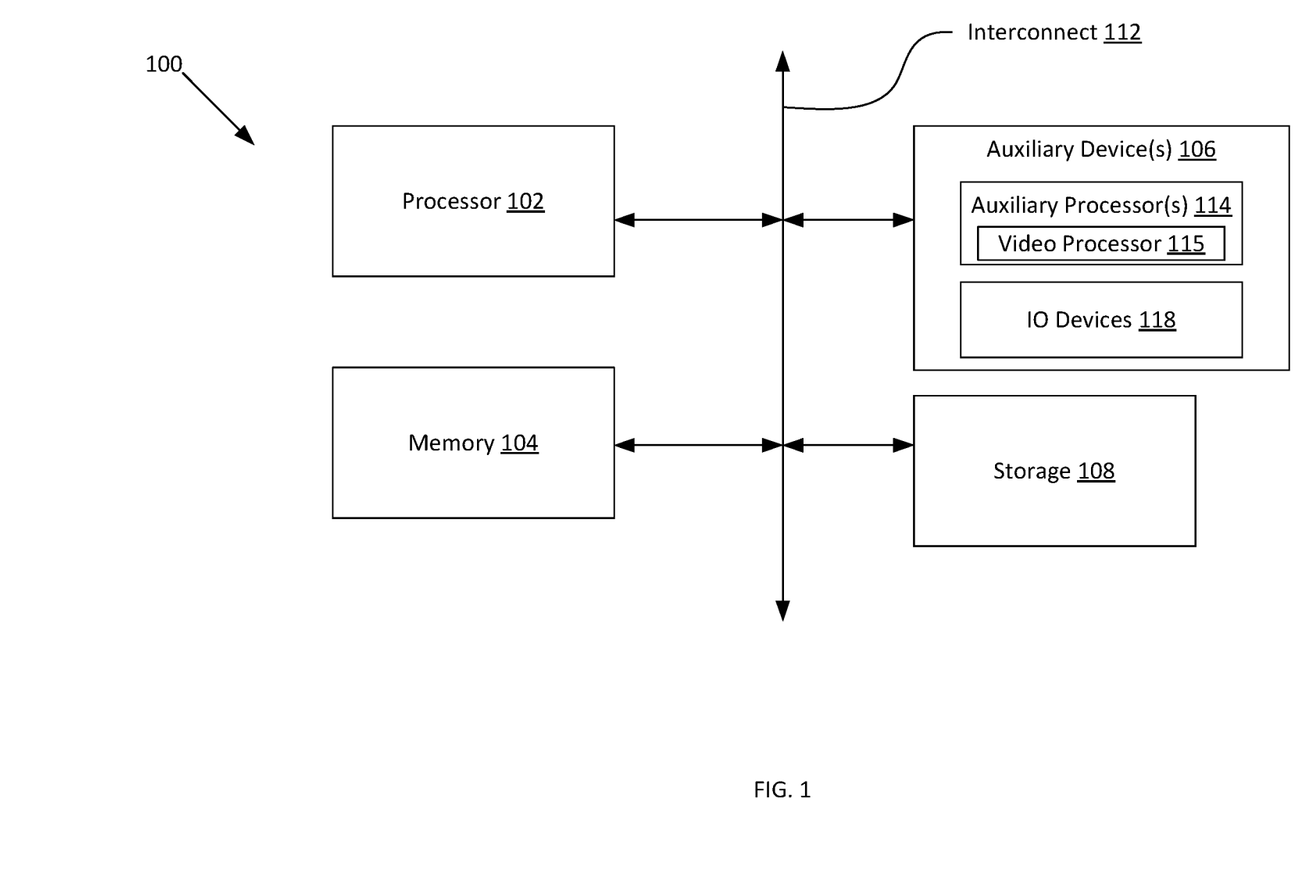
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices 118. The auxiliary processors 114 include, without limitation, an inference processor unit ("IPU"), visual processor unit ("VPU"), which are both application-specific integrated circuit artificial intelligence processors that can perform super-resolution processing, a video post processor or video post processing engine ("VPP" or "VPE"), which can also perform super-resolution processing, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. The super resolution processing is an upscaling process that generates higher resolution images from lower resolution images. In some examples, such processing is performed in processor 102, auxiliary devices 106, or auxiliary processors 114.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The auxiliary processor(s) 114 also include a video processor 115. The video processor 115 performs at least encoding for an incoming video stream. In some examples, the incoming video stream is unencoded and generated by the device 100. In an example, the incoming video stream is generated by a graphics processing unit, for example, by rendering geometry into pixels for a sequence of frames.

The video processor 115 is capable of outputting video in a low complexity enhancement video coding ("LCEVC") format. The LCEVC format encodes a high resolution video as a combination of a low resolution encoded video (a "base encoding") and one or more additional enhancement layers. The enhancement layers describe modifications that, when applied to the base encoding, produce a higher resolution image.

The video processor 115 includes an upscaler that increases the resolution of the incoming video stream. When this upscaler is combined with the LCEVC encoder functionality, some redundancies exist. Techniques are thus provided herein to improve processing performance and/or reduce the required amount of hardware by eliminating at least some such redundancies.

Figure 2:
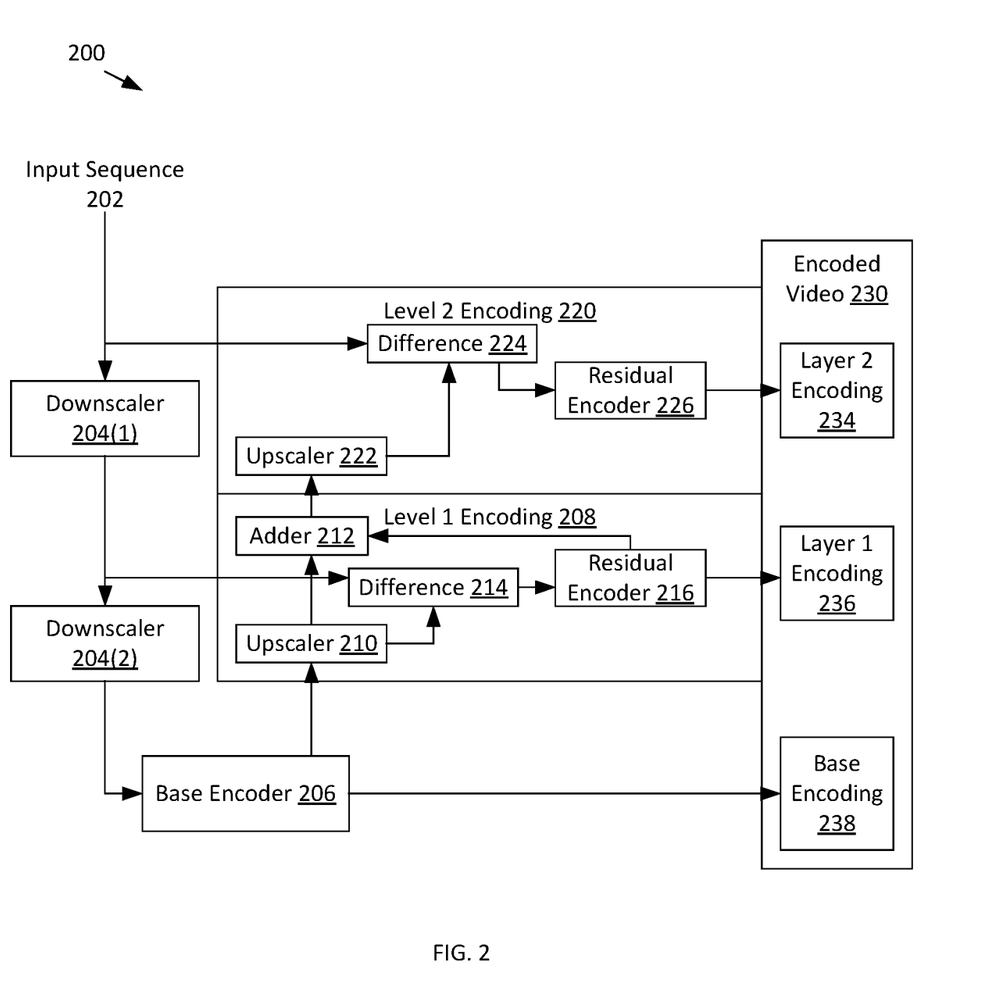
FIG. 2 illustrates a low complexity enhancement video coding encoder, according to an example.

FIG. 2 illustrates a low complexity enhancement video coding ("LCEVC") encoder 200, according to an example. The encoder 200 accepts and encodes an input sequence 202. The input sequence 202 is a sequence of raw video data at a first resolution. A first downscaler 204(1) down-scales the input sequence 202 to a second resolution that is lower than the first resolution. A second downscaler 204(2) down-scales the output of the first downscaler 204(1) to a third resolution that is lower than the second resolution, and provides that output to the base encoder 206. In the present document, the third resolution is sometimes referred to as a low resolution, the second resolution is sometimes referred to as an intermediate resolution, and the first resolution is sometimes referred to as a high resolution. The base encoder 206 generates a base encoding 238, which is an encoded version of the output of the second downscaler 204(2). Put differently, the base encoder 206 receives a version of the input sequence 202 at a base resolution and encodes that base resolution input as a base encoding 238. The encoding performed by the base encoder 206 can include any technically feasible video technique, such as video techniques including motion prediction, discrete cosine transform, quantization, and entropy coding, and other video encoding techniques. Example video codecs that could be used include H.264, H.265, AV1, and other codecs.

The level 1 encoding block 208 and level 2 encoding block 220 produce layer 1 encoding 236 and layer 2 encoding 234, respectively. The base encoding 238, the layer 1 encoding 236, and the layer 2 encoding 234 together comprise an encoded high resolution video. The layer 1 encoding 236 and layer 2 encoding 234 describe enhancements to the base encoding 238 that bring that encoded video to a higher resolution. The layer 1 encoding 236 describes an enhancement to the base encoding 238 and the layer 2 encoding 234 describes an enhancement to the base encoding as modified by the layer 1 encoding 236.

The level 1 encoding block 208 includes an upscaler 210, a difference block 214, a residual encoder 216, and an adder 212. The upscaler 210 upscales a reconstructed version (e.g., decoded) of the encoded video generated by the base encoder 206. As described above, the base encoder 206 generates encoded video at the low resolution. The upscaler converts a reconstructed version to a resolution higher than the low resolution. A difference unit 214 subtracts the output of the downscaler 204(1) from the output of the upscaler 210 to produce a level 1 difference output. The difference unit 214 determines the difference between the video prior to being downscaled to the low resolution and the video after being downscaled to the low resolution and encoded. More specifically, downscaling is a lossy process. For example, when four pixels are converted to one pixel, individual colors of those four pixels are combined in some manner to generate the one pixel, resulting in a loss of information. The difference produced by the different unit 214 is representative of this loss of information. In other words, the difference unit 214 determines the difference between the output of the downscaler 204(1), which is at the intermediate resolution, and the output of the upscaler 210, which is also at the intermediate resolution, but is derived from the base encoding at the low resolution. In some examples, this difference is representative of the information lost by the operations performed by the downscaler 204(2). The output of the difference unit 214 is sometimes referred to here as the residual or the level 1 residual. The residual encoder 216 encodes the difference and provides that difference as output of layer 1 encoding 236. This encoding includes operations such as discrete cosine transform, quantization, and entropy coding for the residual.

An adder 212 sums the encoded residual with the output of the upscaler 210 to provide input to the upscaler 222 of the level 2 encoding block 220. As described above, the encoded residual describes the enhancements made to the upscaled base encoding to produce video at the intermediate resolution. Thus, adding the residual to the output of the upscaler 210 produces an intermediate resolution video.

The level 2 encoding block 220 accepts the output of the adder 212 at the upscaler 222. The upscaler 222 upscales this information to the high resolution. A difference unit 224 obtains a difference between the input sequence 202, which is also at the high resolution, and the output of the upscaler 222. As with the difference unit 214 of the level 1 encoding block 208, the difference unit 224 determines the differences between an upscaled version of the encoded video at the medium resolution and the high resolution input video. In other words, because the output of the upscaler 222 is lossy as compared with the input sequence 202, there is a difference between those two high resolution videos. The difference is encoded by the residual encoder 226 into layer 2 encoding 234 of the encoded video 230.

As can be seen, the LCEVC encoder 200 encodes a high resolution video as an encoded base video plus a combination of layers. Each layer is the encoded version of a difference between a higher resolution upscaled version of a lower resolution version of the image and the actual input image at that higher resolution.

Each of the illustrated components of the LCEVC encoder 200 represents one or more of software executing on a processor, hardware (e.g., a circuit, such as a hard-coded circuit, a general-purpose programmable processor, or any other type of circuit), or a combination of software and hardware.

Figure 3A:
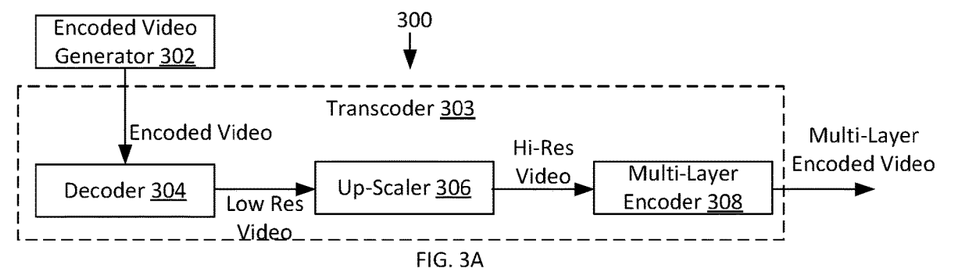
FIG. 3A illustrates a video generation system, according to an example.

FIG. 3A illustrates a video generation system 300, according to an example. The video generation system 300 includes an encoded video generator 302 and a transcoder 303. The encoded video generator 302 generates encoded video at a non-upscaled resolution. The transcoder 303 converts that encoded video to an upscaled resolution. The encoded video generator 302 is any system that generates video at the non-upscaled resolution. In an example, the encoded video generator 302 is a system that generates video and then encodes such video as encoded video. More specifically, in such an example, the encoded video generator 302 includes or receives video input from a video source and encodes the raw video into an encoded format. As stated, the generated video is at a non-upscaled resolution. The encoded video generator 302 may alternatively retrieve encoded video from a source, such as a file system, network source, or other source.

The transcoder 303 decodes that encoded video, upscales that video, and encodes that video according to a video codec to generate an upscaled encoded video. The transcoder 303 includes a decoder 304 that decodes encoded video to generate low resolution raw video. The transcoder 303 also includes an up-scaler 306 that up-scales the low-resolution raw video to generate high-resolution raw video. The transcoder 303 also includes a multi-layer encoder 308 (e.g., an LCEVC encoder) that encodes the high-resolution raw video to generate a high-resolution multi-layer encoded video.

Figure 3B:
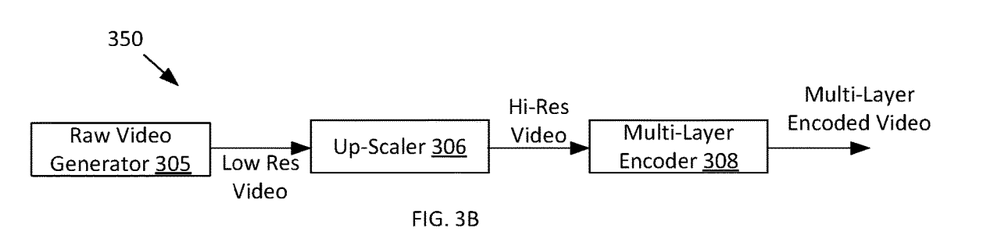
FIG. 3B illustrates a video generation system, according to another example.

FIG. 3B is a block diagram of a video generation system 350 according to another example. The video generation system 350 is similar to the video generation system 300 of FIG. 3A, but works as an encoder rather than a transcoder. More specifically, in the video generation system 350 of FIG. 3B, the original source of video generates raw, rather than encoded video. Thus, a decoder is not present in the video generation system 350 of FIG. 3B. In some examples, the video generation system 350 is or includes a graphics processing unit that generates rendered graphics in a raw (non-encoded) video format.

Figure 4:
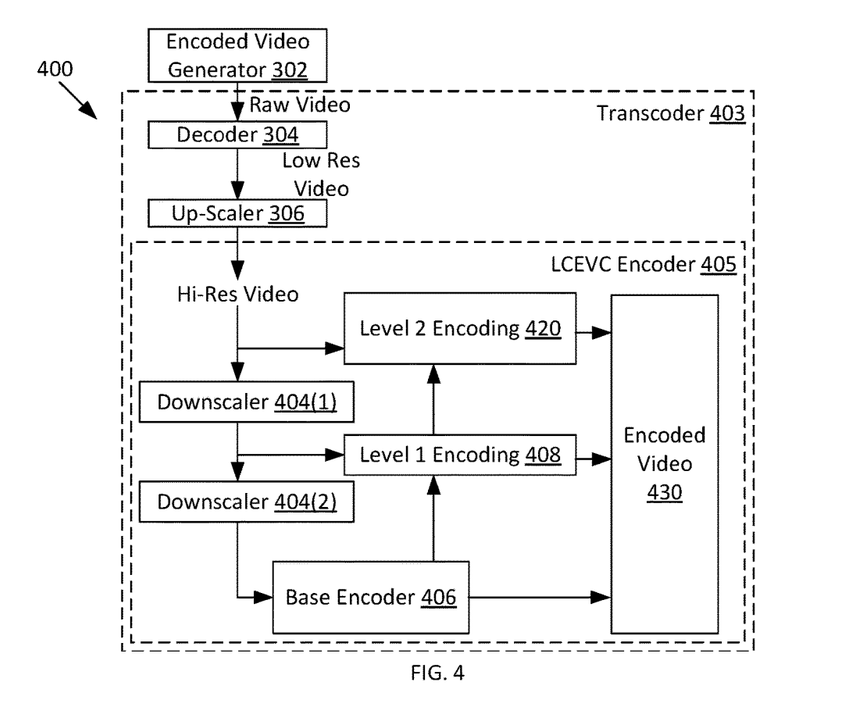
FIG. 4 illustrates a video generator that includes a transcoder, according to an example.

FIG. 4 illustrates a video generator 400 that includes a transcoder 403, according to an example. The video generator 400 generates raw video at an un-upscaled resolution as described with respect to FIG. 3. The decoder 304 decodes that video and an up-scaler 306 up-scales the decoded video to generate high resolution raw video. An LCEVC encoder 405 then encodes the high resolution raw video to generate encoded video 430. The LCEVC encoder 405 of FIG. 4 is similar to that of FIG. 2. Specifically, the downscaler 404(1), downscaler 404(2), base encoder 406, level 1 encoding block 408, and level 2 encoding block 420 are similar to the downscaler 204(1), downscaler 204(2), base encoder 206, level 1 encoding block 208, and level 2 encoding block 220, respectively.

As can be seen, the LCEVC encoder 405 performs certain operations that have redundancy with operations performed by other elements of the transcoder 403. For example, a decoder 304 and upscaler 306 generate video that is subsequent downscaled and compressed by the downscalers 404 and base encoder 406. A technique is thus presented to remove some such redundancies and/or to otherwise provide optimization for a system including an LCEVC encoder that performs transcoding. Specifically, FIGS. 5-7C illustrate several different configurations that implement optimizations as compared with the video generator 400 of FIG. 4.

Figure 5:
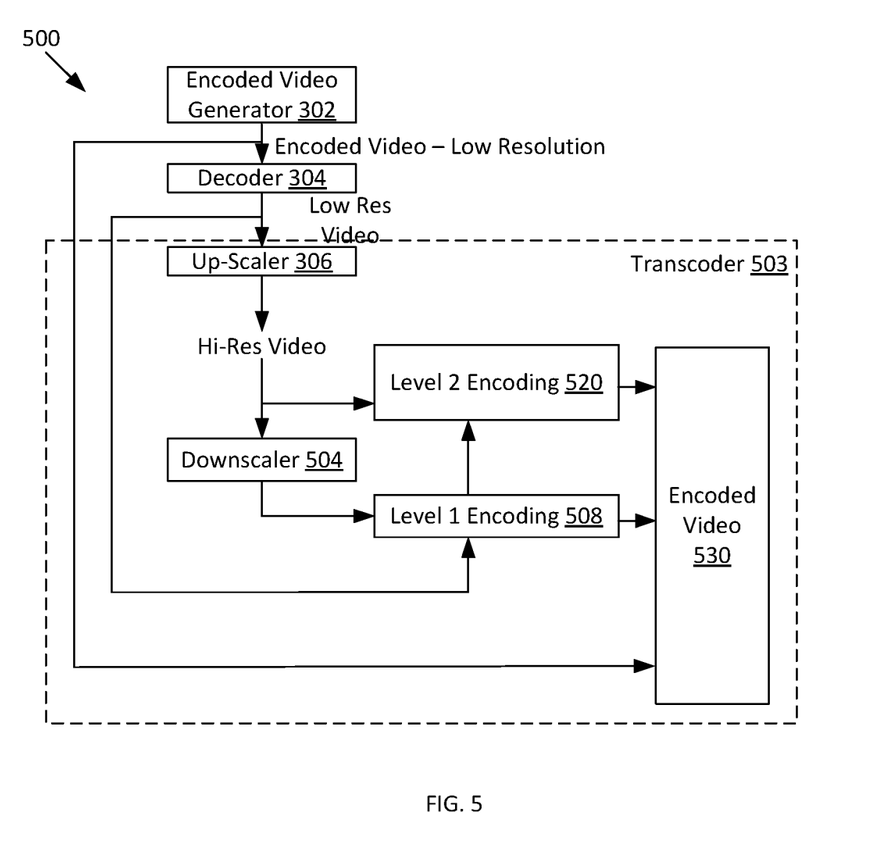
FIG. 5 illustrates a video generator that omits a downscaler and a base encoder as compared with the video generator of FIG. 4, according to an example.

FIG. 5 illustrates a video generator 500 that omits a downscaler and a base encoder as compared with the video generator 400 of FIG. 4, according to an example. An encoded video generator 302, decoder 304, and up-scaler 306 are similar as the corresponding components in FIG. 3 and FIG. 4. A transcoder 503 includes the up-scaler 306, a downscaler 504, a level 1 encoding block 508, and a level 2 encoding block 520.

The encoded video generator 302 is directly provided to the encoded video 530 as base encoding 238 (FIG. 2). As described elsewhere herein, the encoded video 230 includes a base encoding 238, which is an encoded video at a low resolution. Because the input to the system 500 is an encoded video at the low resolution, this information can be directly provided as part of the encoded video 530, rather than requiring the input video to be decoded, up-scaled, downscaled, and re-encoded as in FIG. 4.

In addition to the above, the decoder 304 provides output to level 1 encoding block 508. More specifically, the upscaler 210 (FIG. 2) of the level 1 encoding block 508 upscales the decoded low resolution video from the decoder 304. The level 1 encoding block 508 performs a difference between the output of the downscaler 504 and the upscaled decoded data, and encodes that data via residual encoder 216 (FIG. 2) to produce layer 1 encoding 236. The adder 212 of the level 1 encoding block 508 adds the residual data to the upscaled output from the decoder 304 and provides that information to level 2 encoding block 520, which performs similar operations as described with respect to FIG. 2, using the output from the up-scaler 306, to generate layer 2 encoding 234 (FIG. 2).

In summary, the video generator 500 of FIG. 5 performs transcoding using a low resolution encoded video to generate a high resolution video encoded with LCEVC. The transcoder omits portions of an LCEVC encoder as shown in FIG. 2. More specifically, rather than included two downscalers as in FIG. 2, the transcoder 503 includes one downscaler. In addition, the transcoder 503 does not include a base encoder 206 as in FIG. 2. The transcoder 503 can omit the base encoder 206 as that encoder encodes downscaled raw input video in FIG. 2. However, such encoded video is already provided by the encoded video generator 302. Moreover, a base encoder 206 is not necessary to provide decoded low resolution raw video to the upscaler 210 of the level 1 encoding block 508 (as in FIG. 2), since the decoder 304 already provides that information. In addition, a second downscaler 504, which would downscale the medium resolution raw data is not needed because the video generated by such a downscaler is already provided by the decoder 304.

Figure 6A:
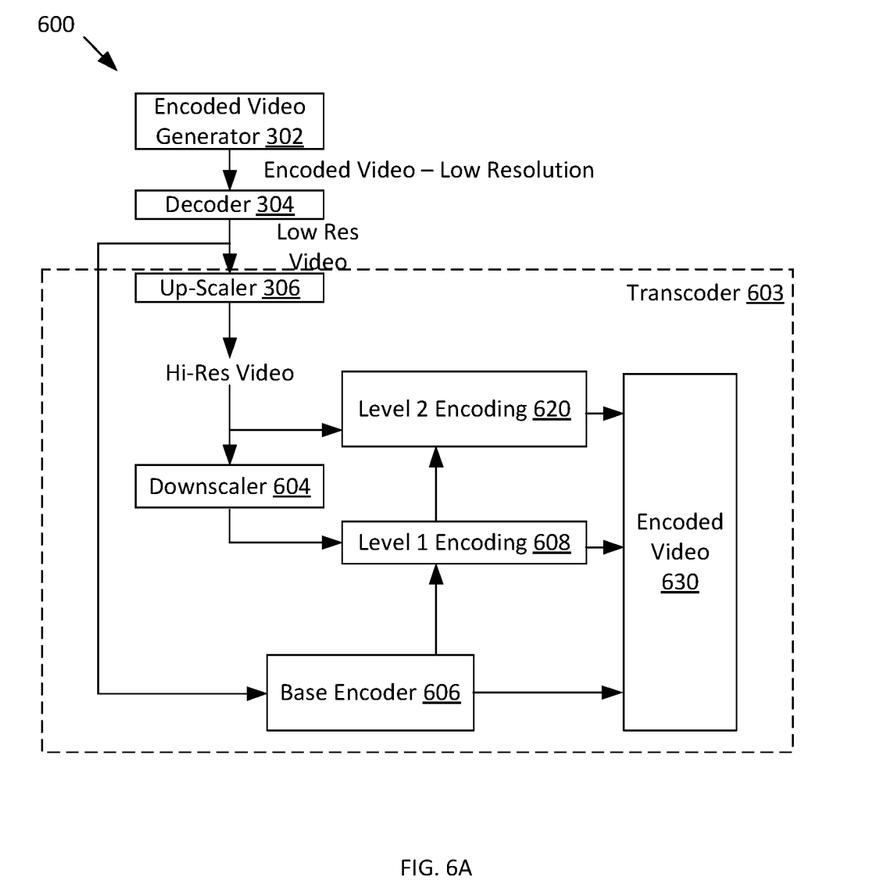
FIG. 6A illustrates a video generator that omits a downscaler from the LCEVC encoder, according to an example.

FIG. 6A illustrates a video generator 600 that omits a downscaler (e.g., downscaler 204(2)) from the LCEVC encoder, according to an example. Unlike with the video generator 500 of FIG. 5, in the video generator 600 of FIG. 6A, a base encoder 606 is included. The encoded video generator 302, decoder 304, and up-scaler 306 are as described with respect to FIG. 3. A downscaler 604 is similar to the downscaler 504 of FIG. 5. The level 1 encoding block 608 and level 2 encoding block 620 are similar to the level 1 encoding block 508 and level 2 encoding block 520 of FIG. 5, and the encoded video 630 is similar to the encoded video 530 of FIG. 5. A base encoder 606 is similar to the base encoder 406 of FIG. 4.

The decoder 304 provides output (decoded video from the encoded video generator 302 to the base encoder 606. The base encoder 606 encodes that video and provides the encoded base video as output in the encoded video 630. The base encoder also provides a decoded version of that output to the level 1 encoding block 608. Specifically, an upscaler 210 (FIG. 2) of the level 1 encoding block 608 receives that video and performs upscaling to generate upscaled video, and a difference unit 214 (FIG. 2) obtains a difference between the output of the downscaler 604 and the upscaled video. The remainder of the level 1 encoding block 608 and level 2 encoding block 620 is as described above, e.g., with respect to FIG. 2.

As can be seen, the video generator 600 omits a downscaler from the LCEVC encoder as compared with the LCEVC encoder of FIG. 2. More specifically, that downscaler is not needed because the output of that downscaler, which would be raw video at the low resolution, is provided by the decoder 304 instead. The video generator 600 includes a base encoder 606 that is omitted from the video generator 500.

In some examples, the encoded video generator 302 and decoder 304 are replaced with a raw video generator. In an example, a raw video generator is a three-dimensional graphics renderer that outputs a sequence of raw images. In other examples, the raw video generator is a file container or opener that opens a video file from a file system or a camera input that obtains video from a camera system. In this situation, an encoder and decoder prior to the transcoder 603 can be omitted, and the base encoder 606 that is part of the LCEVC encoder can be used to generate the base encoding 238 of the encoded video 630. Put differently, in this example, a raw, unencoded image is encoded using a base encoding 238 and is also upscaled using an up-scaler 306 for encoding using a remainder of an LCEVC encoder (e.g., downscaler, level 1 encoding block 608, and level 2 encoding block 620) as shown in FIG. 6A.

Figure 6B:
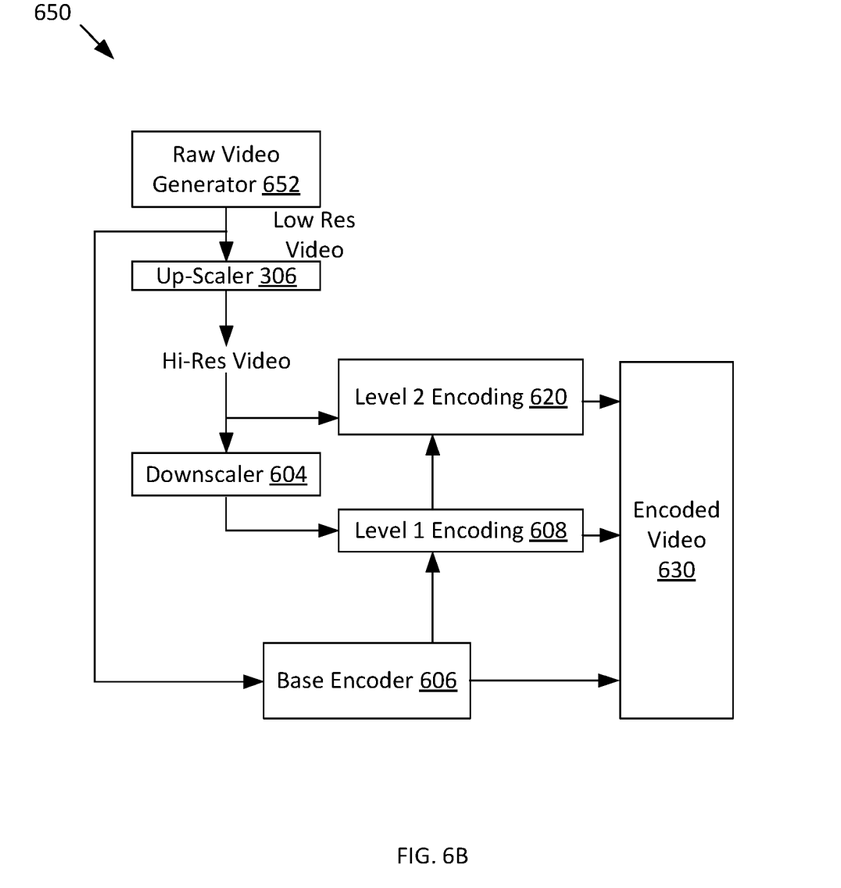
FIG. 6B illustrates a video generator, according to another example.

FIG. 6B is a block diagram of a video generation system 650, according to an example. The video generation system 650 is similar to the video generation system 600 of FIG. 6A, but, as with FIG. 3B, the video generation system 650 is an encoder rather than a transcoder. Thus the initial video generation is a raw video generator 652 and the video generation system 650 does not include a decoder.

Figure 7A:
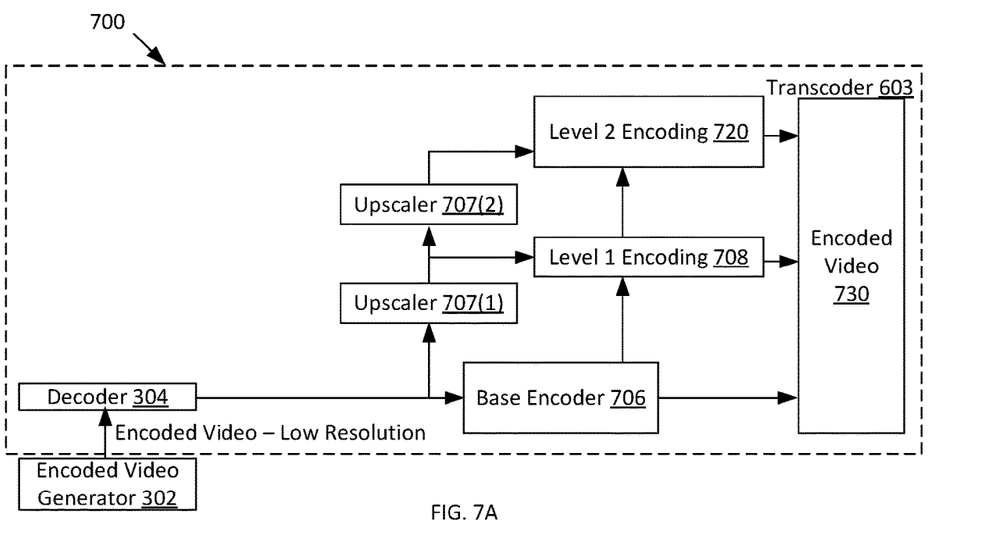
FIG. 7A illustrates a video generator according to another example.

FIG. 7A illustrates a video generator 700 according to another example. An encoded video generator 302 provides encoded video at a low resolution to a decoder 304. The decoder decodes the encoded video and provides output to a base encoder 706 and an upscaler 707(1). The upscaler 707(1) upscales the decoded video to an intermediate resolution and provides that as output to the level 1 encoding block 708 and to the upscaler 707(2). The upscaler 707(2) upscales the intermediate video to a high resolution and provides that as output to the level 2 encoding block 720. In the video generator 700, an initial upscaler (e.g., upscaler 306) is omitted and instead upscaler 707(1) and upscaler 707(2) are used to generate upscaled video. In other words, where in other implementations, an upscaler is first used to generate upscaled video (e.g., upscaled encoded video) and then an LCEVC encoder is used to encode that upscaled video, in the video generator 700 of FIG. 7A, upscalers 707 replace the downscalers (e.g., downscalers 204) of the LCEVC encoder. The base encoder 706, level 1 encoding block 708, and level 2 encoding block 720 are similar to the base encoder 406, level 1 encoding block 408, and level 2 encoding block 420 of FIG. 4. In some examples, the upscalers 707 output upscaled video of higher quality than the upscaler 210 and 222 of FIG. 2.

The decoder 304 decodes the encoded video at a low resolution and provides that encoded video to the base encoder 706. The base encoder 706 encodes that video at a low resolution and provides that encoded video as the base encoding 238 (FIG. 2). The base encoder 706 also provides reconstructed video to the level 1 encoding block 708 (specifically to the upscaler 210). The upscaler 210 generates upscaled video from the output of the base encoder 706 and a difference block 214 of the level 1 encoding block 708. The level 1 encoding block 708 encodes the residual output by the difference block 214 to generate output for the encoded video 730 and also provides this encoded residual, added to the output of the upscaler 210, to the level 2 encoding block 720 (specifically to the upscaler 222).

The upscaler 222 upscales this summed signal and a difference block 224 obtains the difference between the output of the upscaler 707(2) and the upscaled summed signal. A residual encoder 226 encodes the output of the difference block 224 and provides that output as layer 2 encoding 234 for the encoded video 730.

In summary, the downscalers 204 that are configured to downscale upscaled encoded video have been replaced with upscalers that directly upscale encoded video. In other words, instead of up-scaling video at a low resolution and then processing the up-scaled video through an LCEVC encoder that includes downscalers, the low resolution video from the encoded video generator 302 is decoded and then upscaled, with the output of these upscalers used within the level 1 encoding block 708 and level 2 encoding block 720. This configuration allows the upscaler 306 to be integrated within the LCEVC encoder, and for the downscalers 404 of the LCEVC encoder to be omitted. The upscalers 707 provide similar output as the downscalers 404, but do so by upscaling low resolution video instead of downscaling already upscaled video.

Figure 7B:
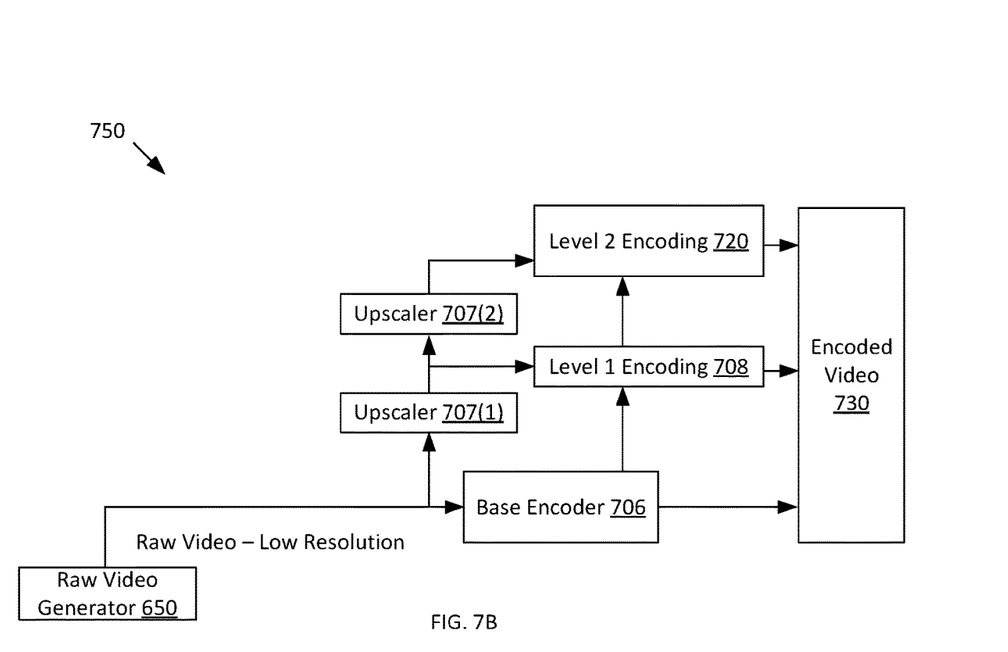
FIG. 7B illustrates a video generator according to yet another example.

FIG. 7B is a block diagram of a video generation system 750 according to an example. The video generation system 750 is similar to the video generation system 700 of FIG. 7A, but the video source is a raw video generator 650. Thus, the video generation system 750 does not include a decoder.

Figure 7C:
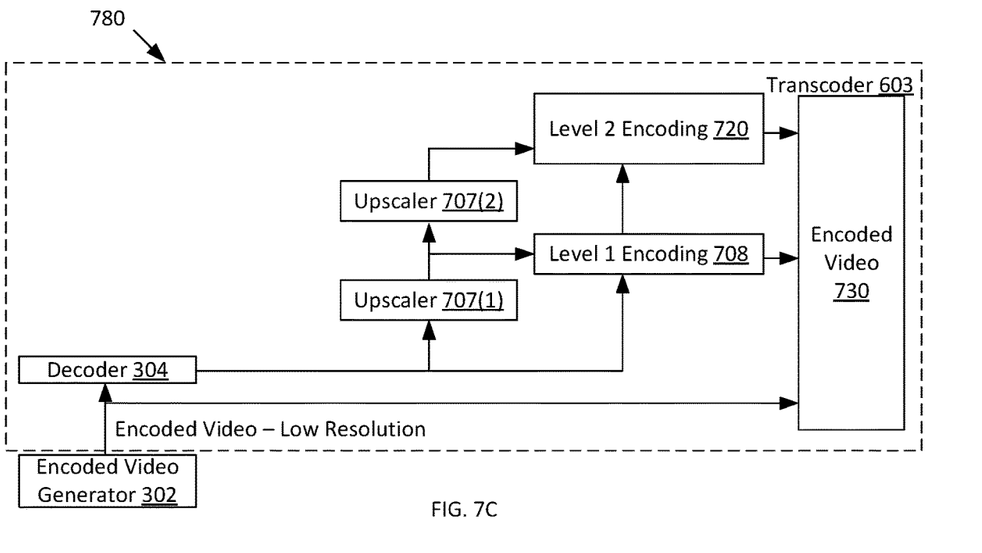
FIG. 7C illustrates a video generator according to still another example.

FIG. 7C is a block diagram of a video generation system 780 according to another example. In the example system of FIG. 7C, the video source is an encoded video generator 302, and a decoder 304 is present. However, unlike the video generation system 700 of FIG. 7A, the transcoder 603 does not include a base encoder 706. Instead, in a somewhat similar manner as with the configuration of FIG. 5, in FIG. 7C, the output of the encoded video generator 302 is provided directly as output in the encoded video 730. That output is also provided to a decoder 304, which decodes that output. The output of the decoder is provided to the upscaler 707(1) and the level 1 encoding block 708, both of which function similarly to the corresponding system of FIG. 7A.

Figure 8:
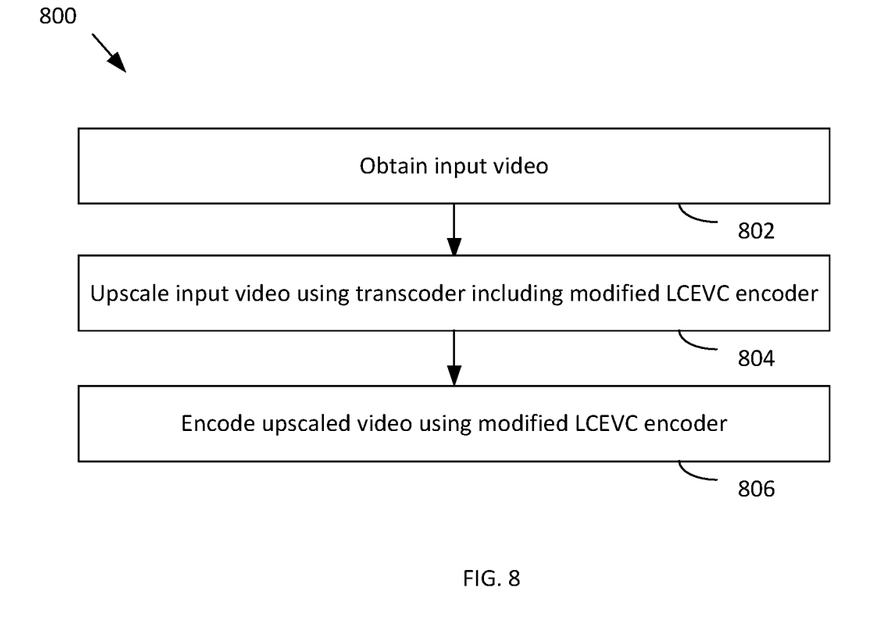
FIG. 8 is a flow diagram of a method for processing video, according to an example.

FIG. 8 is a flow diagram of a method 800 for processing video, according to an example. Although described with respect to the system of FIGS. 1-7, those of skill in the art will understand that any system configured to perform the steps of the method 800 in any technically feasible order falls within the scope of the present disclosure.

At step 802, a video generator obtains input video. The input video can come from any technically feasible source. In some examples, the input video is already encoded and in other examples, the video is not encoded. In some examples, the input video has a low resolution, which is lower than an intermediate resolution, which is, in turn, lower than a high resolution.

In some examples, the input video is generated by a rendering pipeline that accepts input geometry and generates a series of images. The input video is, in some such examples, subsequently encoded by an encoder, but in other examples, that input is not encoded by an encoder. In another example, an encoder encodes raw video generated in some other manner or stored in a storage device such as a hard disk. In another example, the input video is generated by teleconferencing software or hardware in raw form, subsequently encoded, and then provided to a video generator. In various examples, the video generator is the video generator 500, video generator 600, or video generator 700, although any configuration consistent with the teachings provided herein is contemplated.

At step 804, the video generator upscales the input video using a transcoder that includes a modified low complexity enhancement video coding ("LCEVC") encoder. The transcoder modifies incoming video by upscaling the video and encoding that video in an LCEVC format. Two types of transcoder are supported. A first type modifies an incoming raw video by upscaling that raw video and encoding that raw video into an LCEVC format. A second type modifies an incoming encoded video by decoding, upscaling, and encoding the video to an LCEVC format. The LCEVC format includes a base encoding which is an encoding of a low resolution video, a layer 1 encoding, which is an encoding of a residual for an intermediate resolution as described elsewhere herein, and a layer 2 encoding, which is an encoding of a residual for a high resolution as described elsewhere herein.

The upscaling including converting the incoming video at the low resolution to one or both of an intermediate resolution or a high resolution. In one example (FIGS. 5 and 6), a decoder 304 decodes low resolution video and an upscaler up-scales that video to a high resolution. In another example (FIG. 7A), a first upscaler 707(1) upscales the input video to an intermediate resolution and a second upscaler 707(2)

upscales the intermediate resolution video to a high resolution. The upscalers 707 can be viewed as part of an LCEVC encoder.

At step 806, a video generator encodes the upscaled input video using a modified LCEVC encoder. In some examples (FIG. 5), the modification includes removal of a base encoder and a downscaler. In such examples, the encoding includes outputting the encoded video of the input (step 802) as the base encoding 238. The encoding further includes decoding that input via a decoder 304 and upscaling the decoded video via an upscaler 306. The upscaled video is provided to a downscaler 504 which downscales the video to an intermediate resolution. The level 1 encoding block 508 accepts the output of the downscaler 504 and the output of the decoder 304 and generates a layer 1 encoding 236 as described elsewhere herein. The level 2 encoding block 520 accepts output from the level 1 encoding block 508 and output from the upscaler 306 and generates a layer 2 encoding 234 as described elsewhere herein.

In other examples (FIG. 6A), the modification includes removal of a downscaler. In some such examples, the input video is not encoded and thus a decoder is also removed, while in other such examples, the input video is encoded and thus a decoder (e.g., 304) is used. In these examples, the encoding includes outputting unencoded input video (e.g., passed through a decoder 304 or passed through as unencoded input) to a base encoder 606. The base encoder 606 encodes that unencoded video and provides the output as part of the encoded video 630. An up-scaler 306 upscales the unencoded input video to produce high resolution video. This high resolution video is provided to a downscaler 604 and a level 2 encoding block 620. The downscaler downscales the high resolution video to intermediate resolution video. The level 1 encoding block 608 processes output from the base encoder 606 and the downscaler 604 as described elsewhere herein to generate a layer out output for the encoded video 630. The level 2 encoding block 620 accepts output from the level 1 encoding block 608 and the high resolution up-scaled video (output from up-scaler 306) and processes that information to generate a layer 2 portion for the encoded video 630.

In yet other examples, the modification includes removal of the downscaler(s) (e.g., downscalers 204(1) and 204(2)) and integration of upscales with the LCEVC encoder (FIG. 7A). Decoded or raw input video is provided to a base encoder 706 and an upscaler 707(1). The base encoder 706 encodes the low resolution unencoded video and provides that encoded video as part of the encoded video 730. The upscaler 707(1) provides upscaled video at an intermediate resolution to the level 1 encoding block 708, which also receives video from the base encoder 706. The level 1 encoding block 708 generates a level 1 video output for the encoded video 730. An upscaler 707(2) upscales output of upscaler 707(1) and provides output to the level 2 encoding block 720, which also receives output from the level 1 encoding block 708 as described elsewhere herein. The level 2 encoding block 720 processes this information as described elsewhere herein and provides output to encoded video 730.

It should be understood that many variations are possible based on the disclosure herein. In an example, although a multi-layer encoder has been shown in the various figures as having two layers, a multi-layer encoder may use more or fewer layers than this. Thus, elements such as upscalers or downscalers and layer encoder blocks may be reduced or duplicated as needed in alternative implementations. Although features and elements are described above in particular combinations, each feature or element can be used alone without the other features and elements or in various combinations with or without other features and elements.

The various functional units illustrated in the figures and/or described herein (including, but not limited to, the processor 102, the auxiliary devices 106 (including the IO devices 118, auxiliary processor 114, and video processor 115), downscalers and upscalers (e.g., 204, 210, 222, 306, 404, 504, 604, and 707), the level 1 encoding blocks (e.g., 208, 408, 508, 608, 708) and components therein (e.g., adder 212, difference unit 214, and residual encoder 216), level 2 encoding blocks (e.g., 220, 420, 520, 620, 720) and components therein (e.g., difference unit 224 and residual encoder 226)) may be implemented as a hardware electronic circuit, a general purpose computer, a processor, or a processor core, as a program, software, or firmware, stored in a non-transitory computer readable medium or in another medium, executable by a general purpose computer, a processor, or a processor core, or as a combination of two or more of a processor, a circuit, or software. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask-works that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    obtaining input video at a first resolution;
    upscaling the input video to a second resolution that is higher than the first resolution, using an encoder, to generate upscaled video;
    encoding the upscaled video using the encoder to generate encoded output video;
    downscaling the upscaled video to generate downscaled video at a third resolution lower than the second resolution and higher than the first resolution; and
    processing the downscaled video, along with decoded input video, to generate a layer 1 encoding.

2. The method of claim 1, wherein the encoder omits one or more downscalers.

3. The method of claim 1, further comprising:
    providing the input video as part of encoded output video.

4. The method of claim 1, further comprising encoding the input video to generate a portion of the encoded output video.

5. The method of claim 4, further comprising downscaling the upscaled video to an intermediate resolution video at a third resolution that is lower than the second resolution and higher than the first resolution.

6. The method of claim 5, further comprising:
generating a layer 1 encoding based on the intermediate resolution video and output of a base encoder; and
generate a layer 2 encoding based on output of a level 1 encoding block and on the upscaled video.

7. The method of claim 1, further comprising generating a layer 1 encoding based on the upscaled video and the video at the first resolution.

8. The method of claim 7, further comprising generating a layer 2 encoding based on upscaled video at a third resolution and output of a level 1 encoding block configured to generate the layer 1 encoding.

9. An encoding system, comprising:
an upscaler configured to obtain input video at a first resolution and to upscale the input video to a second resolution that is higher than the first resolution, to generate upscaled video; and
an encoder configured to encode the video at the second resolution to generate encoded output video;
a downscaler configured to downscale the upscaled video to generate downscaled video at a third resolution lower than the second resolution and higher than the first resolution; and
a level 1 encoder configured to process the downscaled video, along with decoded input video, to generate a layer 1 encoding.

10. The encoding system of claim 9, wherein the encoder omits one or more downscalers.

11. The encoding system of claim 9, wherein the input video comprises a part of output of the encoding system.

12. The encoding system of claim 9, further comprising a base encoder configured to encode the input video to generate a portion of the encoded output video.

13. The encoding system of claim 12, further comprising a downscaler configured to downscale the upscaled video to an intermediate resolution video at a third resolution that is lower than the second resolution and higher than the first resolution.

14. The encoding system of claim 13, further comprising:
a level 1 encoding block configured to generate a layer 1 encoding based on the intermediate resolution video and output of a base encoder; and
a level 2 encoding block configured to generate a layer 2 encoding based on output of a level 1 encoding block and on the upscaled video.

15. The encoding system of claim 9, further comprising a level 1 encoding block configured to generate a layer 1 encoding based on the upscaled video and the video at the first resolution.

16. The encoding system of claim 15, further comprising a level 2 encoding block configured to generate a layer 2 encoding based on upscaled video at a third resolution and output of a level 1 encoding block configured to generate the layer 1 encoding.

17. A non-transitory computer-readable medium storing instructions that, when executed by a processor, cause the processor to perform operations including:
obtaining input video at a first resolution;
upscaling the input video to a second resolution that is higher than the first resolution, using an encoder to generate upscaled video;
encoding the upscaled video using the encoder to generate encoded output video;
downscaling the upscaled video to generate downscaled video at a third resolution lower than the second resolution and higher than the first resolution; and
processing the downscaled video, along with decoded input video, to generate a layer 1 encoding.

18. The non-transitory computer-readable medium of claim 17, wherein the encoder omits one or more downscalers.

19. The non-transitory computer-readable medium of claim 17, wherein the operations further comprise:
providing the input video as part of encoded output video.

20. The non-transitory computer-readable medium of claim 17, wherein the operations further comprise:
encoding the input video to generate a portion of the encoded output video.

* * * * *